Jan. 4, 1927.
C. A. NORGREN
AIR CHUCK
Filed April 6, 1926
1,613,527
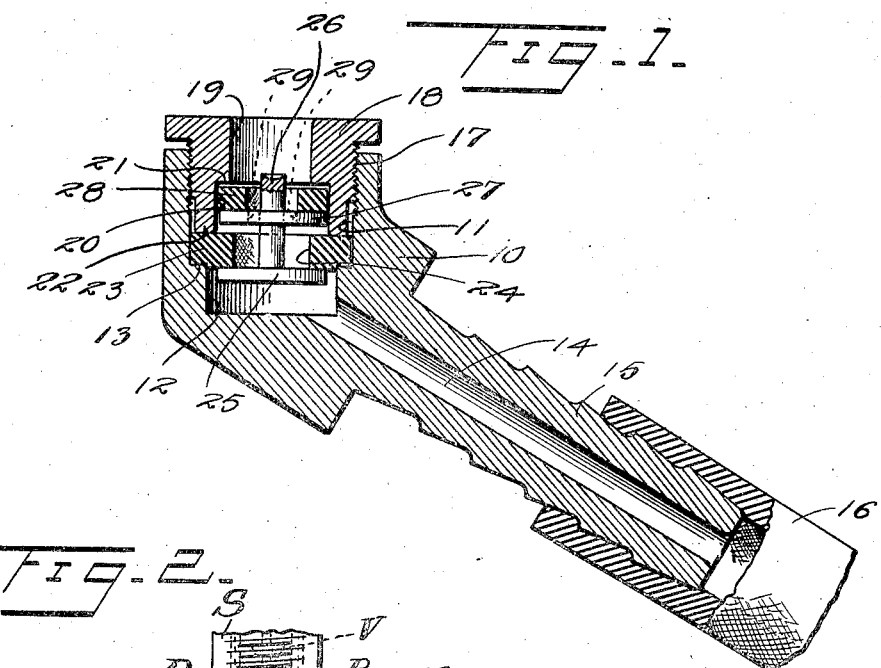
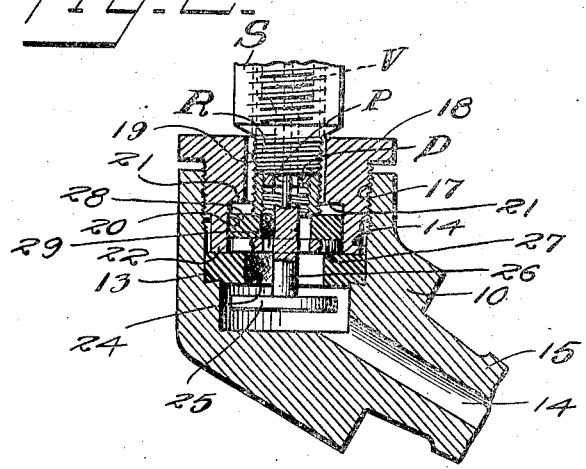
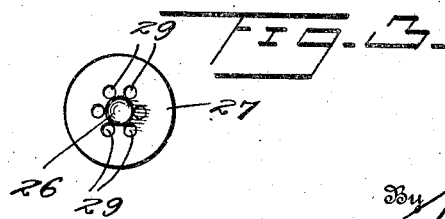
Inventor
C. A. Norgren
By Watson E. Coleman
Attorney Patented Jan. 4, 1927.

1,613,527

UNITED STATES PATENT OFFICE.

CARL A. NORGREN, OF DENVER, COLORADO.

AIR CHUCK.

Application filed April 6, 1926. Serial No. 100,137.

This invention relates to air chucks and more particularly to an air chuck for connecting an air line with the valve stem of a tire.

An important object of the invention is to provide a device of this character in which the gasket which engages the valve stem to provide a seal during the operation of filling the tire floats with the check valve of the chuck so that undue strain cannot be brought to bear thereagainst and a proper sealing engagement is assured. The ends of the valve stems of tires are often very rough and in one well known type of air chuck now in use with tire filling apparatus, a fixed gasket is employed which is engaged and flexed by the tube. Both in its engagement and in its flexing of this gasket but particularly while flexing the gasket, the filling tube has a tendency to tear the same with the result that the gasket rapidly becomes inefficient and must be very frequently replaced.

Furthermore, in the type of air chuck just referred to, the means for shifting the check valve employed to cut off air when the chuck is not in use is an extension of the stem of the check valve which engages against the end of the tire valve. In endeavoring to make a tight seal with the gasket, particularly when the gasket becomes worn, the user will often force the chuck down tightly upon the end of the tire valve with the result that considerable force is exerted against this stem portion. When a valve of this character is new, the valve stem of the tire simultaneously engages both the rubber gasket and the stem portion of the check valve, but as this rubber gasket becomes worn, it first has a tendency to leak around the stem valve and later to cause the chuck itself to leak, due to the enlargement of the hole by the tire valve. Furthermore, in this type of valve, the valve stem serves both as a means for shifting the check valve and the valve stem of the check valve and for unseating the valve of the tire valve. In order that the entire strain may not be placed against the tire valve, it is necessary that the check valve stem fit against the outer wall of the valve stem with the result that a considerable obstruction to the passage of air into the tire valve stem is formed. An important object of this invention is accordingly the production of a device of this character wherein a floating washer is employed which serves both as a seal against the end of the valve stem and as a means for shifting the check valve to its open position.

A further object of the invention is to provide a construction of this character wherein the movement of the check valve and the floating washer is limited by a cushioning limit so that sudden jamming of the check is effectually prevented and accordingly considerable strain removed from the working parts thereof.

These and other objects I attain by the construction shown in the accompanying drawing, wherein for the purpose of illustration is shown a preferred embodiment of my invention and wherein:—

Figure 1 is a longitudinal sectional view through an air chuck constructed in accordance with my invention showing the position normally occupied by the air valve and associated mechanism;

Figure 2 is a similar view showing the positions assumed when the valve stem of the tire is inserted;

Figure 3 is an end elevation of the valve member showing the construction of the guiding flange.

Referring now more particularly to the drawing, the numeral 10 indicates a chuck head having a bore 11 opening through one face thereof. The inner end of this bore is reduced, as at 12, thereby forming an outwardly facing shoulder 13. With the reduced bore 12 a port 14 communicates, this port extending longitudinally of a tubular nipple 15 which is adapted for engagement with the ordinary air hose 16.

The outer end of the bore 11 is threaded, as at 17, for engagement by a nut 18 having a bore 19, the inner end of which is enlarged, as at 20, to produce an inwardly facing shoulder 21. The inner end 22 of this nut opposes the shoulder 13 and coacts therewith to secure in position a valve seat 23 consisting of a resilient washer, in the construction of which any suitable material may be employed. The bore 24 of this washer is of less diameter than the enlarged bore 20 of the bore of the nut 18.

Within the reduced portion 12 of the bore of the body 10 is arranged a check valve 25 for coaction with the seat, this valve having a stem 26 of such length that when the valve is seated, it projects through the enlarged portion 20 of the bore of the nut 18 for a slight distance into the smaller portion of this bore. Intermediate its ends, this stem is formed with a flange 27 having a sliding fit in the enlarged portion 20 of the bore of the nut 18 and this flange is so arranged upon the stem that when the valve 25 is seated, there is a space between the shoulder 21 and the outer face of the flange. Between the shoulder 21 and the outer face of the flange is arranged a packing washer 28 having a central opening of substantially the same size as the internal diameter D of the valve stem S. The flange has formed therein a plurality of openings 29 grouped about the stem 26 and paralleling the same. This stem has a diameter less than the internal diameter of the outer end of the valve stem so that it extends freely into the valve stem and provides a space between its outer face and the inner wall of the valve stem of the tire for the passage of air. The bore 19 of the nut is of a size to slidably receive and guide the reduced outer end R of the valve stem.

In the use of the chuck, when the chuck is applied to the valve stem of a tire, the end of the reduced portion R engages against the washer 28 moving the washer 28 inwardly and accordingly moving the flange 27, valve stem 26 and valve 25, thereby unseating the valve. As the movement continues, the inner face of the flange comes into engagement with the outer face of the seat 23, thereby limiting the inward movement of the valve and enabling the end wall of the reduced portion R of the valve stem of the tire to slightly compress the washer 28 and thereby insure a sealing engagement at this point. In this sealing engagement, both the washers 28 and 23 serve to cushion the movement of the chuck on the valve stem so that there is no harsh engagement which is liable to cause damage. The outer end of the stem 26, by its engagement with the valve pin P, unseats the valve V of the valve stem with the result that unobstructed passage for air is provided between the valve 25 and its seat through the openings 29 of the flange 27 and between the inner wall of the tire valve stem and the valve stem 26. It will be obvious that because of the cushioning engagement, the life of the sealing washer 28 will be materially extended and that a tight seal of the chuck when not in use will be provided. It will also be obvious that destruction of the valve pin and the valve of the chuck by harsh engagement therebetween is avoided. It will be noted that the end of the stem 26 is socketed, as at 26ª, with a concave socket so that there is no tendency of the valve pin to slide from the end of the valve stem 26 when the device is being applied.

Since the construction hereinbefore set forth is capable of a certain range of change and modification without materially departing from the spirit of the invention, I do not limit myself to such specific structure except as hereinafter claimed.

I claim:—

1. In an air chuck, a casing having a passage for compressed air, a flexible gasket secured marginally to said casing, a check valve coacting with the gasket to seal against the passage of air through the chuck, a second gasket freely movable longitudinally of the air passage and adapted to contact the end of the valve stem of a tire, means limiting the inward movement of said second gasket and means operated by the movement of said second gasket for unseating the check valve.

2. In an air chuck, a casing having a passage for compressed air, a flexible gasket secured marginally to said casing, a check valve coacting with the gasket to seal against the passage of air through the chuck, a second gasket movable longitudinally of the air passage and adapted to contact the end of the valve stem of a tire, means limiting the inward movement of said second gasket and means operated by the movement of said second gasket for unseating the check-valve including a stem for the check valve having a flange against which the inner face of said gasket engages, said flange having openings to permit the passage of air to the valve stem of the tire.

3. In an air chuck, a casing having a passage for compressed air, a flexible gasket secured marginally to said casing, a check valve coacting with the gasket to seal against the passage of air through the chuck, a second gasket movable longitudinally of the air passage and adapted to contact the end of the valve stem of a tire, means limiting the inward movement of said second gasket and means operated by the movement of said second gasket for unseating the check valve including a stem for the check valve having a flange against which the inner face of said gasket engages, said flange having openings to permit the passage of air to the valve stem of the tire, the outer end of said stem being of less diameter than the internal diameter of the valve stem of the tire at its outer end and extending thereinto when the valve stem is engaged with the washer.

4. In an air chuck, a body having a bore opening through one face thereof, the inner end of the bore being reduced, a nipple for placing the inner end of the bore in communication with a source of air under pressure, a nut seated in the outer end of the bore, a resilient valve seat clamped between the inner end of the nut and a shoulder produced by the production of the bore of the body, said nut having a bore the outer end of which is adapted to slidably receive the reduced end of the valve stem of a tire, the inner end of the bore of the nut being enlarged, a check valve arranged within the reduced portion of the bore of the body and having a stem projecting into the enlarged portion of the bore of the nut, a packing washer longitudinally movable within the enlarged portion of the bore of the nut and having an internal diameter equal to the internal diameter of the valve stem of the tire and means projecting outwardly from the valve stem of said check valve between said seat and said washer for engagement by said washer to thereby shift the valve stem and check valve to unseat the check valve.

In testimony whereof I hereunto affix my signature.

CARL A. NORGREN.